United States Patent [19]

Aberson et al.

[11] Patent Number: 5,185,843
[45] Date of Patent: Feb. 9, 1993

[54] RESTORATION KIT FOR COMMUNICATIONS CABLE

[75] Inventors: James A. Aberson, Atlanta; Eugene Halupke, Marietta; William A. Vicory, Duluth, all of Ga.

[73] Assignee: AT&T Bell Laboratories, Murray Hill, N.J.

[21] Appl. No.: 826,703

[22] Filed: Jan. 28, 1992

[51] Int. Cl.⁵ .......................... G02B 6/00; G02B 6/36
[52] U.S. Cl. .................................................... 385/134
[58] Field of Search ................ 385/134, 135, 136, 137

[56] References Cited

U.S. PATENT DOCUMENTS

| | | | |
|---|---|---|---|
| 4,428,645 | 1/1984 | Korbelak et al. | 350/96.20 |
| 4,805,979 | 2/1989 | Bossard et al. | 350/96.20 |
| 4,820,007 | 4/1989 | Ross et al. | 350/96.20 |
| 4,913,517 | 4/1990 | Arroyo et al. | 350/96.23 |
| 4,927,227 | 5/1990 | Bensel et al. | 350/96.20 |
| 5,010,210 | 4/1991 | Sidi et al. | 174/34 |
| 5,042,901 | 8/1991 | Merriken et al. | 385/135 |

OTHER PUBLICATIONS

Nirasawa et al., "A Newly Developed Water-Blocking Fiber Optic Cable", Sumitomo Electric Technical Review, Number 26, Jan. 1987, pp. 63-69.

*Primary Examiner*—Akm E. Ullah
*Attorney, Agent, or Firm*—E. W. Somers; D. E. Hayes, Jr.

[57] ABSTRACT

In order to restore quickly service which has been interrupted by damage in at least a portion of a cable, ends of optical fibers on one side of a damage location are spliced to optical fiber end portions of a restoration cable (70) within first and second closures (22,23) of a restoration kit (20). The first closure is attached to a foamed polymeric mounting pad attached to one flange of a deployment reel (100) mounted rotably on a payout spindle (135) which extends normally from one portion of a carrying case (21). Optical fibers of each end of the restoration cable are connected to splicing devices mounted in splicing modules (40,40) in the first and second closures. The second closure is moved from the case toward an opposite side of the damage location whereat fibers of the damaged cable on the other side of the damage location are extended into the second closure and spliced to the restoration cable therein. Because the first closure is attached to the deployment reel, the first closure turns with the reel as the reel is turned rotatably during payout of the restoration cable.

17 Claims, 6 Drawing Sheets

RESTORATION KIT FOR COMMUNICATIONS CABLE

TECHNICAL FIELD

This invention relates to a restoration kit for communications cable. More particularly, this invention relates to a restoration kit which may be used to restore service to locations served by a damaged cable.

BACKGROUND OF THE INVENTION

The use of communication cables which include a plurality of optical fibers is rapidly expanding. An optical fiber cable may comprise a plurality of glass fibers each of which is protected by at least one layer of a coating material. The optical fibers may be assembled into units in which the fibers are held together by binder ribbons to provide a core. In one manufacturer's line of cables, the core is enclosed by a plastic tube and a plastic jacket.

During the service life of an optical fiber cable, the cable may become damaged. This may occur, for example, through unintentional contact by various kinds of excavation equipment, by lightning or by repeated attacks by animals such as gophers. Such damage may be partial, in which case one or several optical fibers may be interrupted, or the damage may be total, such as a complete cable cut, for example.

In any case, it becomes necessary to restore service as quickly as possible. This may be done through an expedited temporary arrangement while more work is under way to replace the damaged cable with an equivalent or enhanced system.

A temporary arrangement must be one which is easily installed and which is low in cost. Elements of the arrangement must be capable of being packaged in a carrying case which is portable and desirably, in one which may be carried by an individual from a vehicle to a field location at which a disruption to service has occurred.

Whatever the structure of the damaged cable, there must be provisions for connecting, such as by splicing, transmission media of the cable on each side of the damage location to corresponding transmission media of a restoration cable which is used to bridge around the damage location. It is conventional to use a closure, within which all conductors are connected, wrapped and stored and protected environmentally.

During the connection of metallic conductors, it is customary to bend sharply the conductors, to provide access to other connections. The physical nature of glass optical fibers forecloses the adoption of connectorization techniques which are used with metallic conductors within a closure. Because of their small size and relative fragility, special considerations must be given to the handling of optical fibers in closures. Transmission capabilities may be impaired if an optical fiber is bent beyond an allowable bending radius, the point at which light no longer is totally contained in the core of the fiber. Furthermore, expected lives of the fibers will be reduced if bent to less than the minimum bending radius.

In the prior art, fiber slack normally has been provided adjacent to connective arrangements. When splicing optical fibers by mechanical means or by fusion, it becomes necessary to provide enough slack fiber so that the fiber can be pulled out of a closure and positioned in apparatus for the preparation of fiber ends and the joining together of the ends.

As might be expected, fiber closures are available in the prior art. Some of these prior art closures have shortcomings insofar as being used in a temporary restoration arrangement. See U.S. Pat. No. 4,820,007 which issued on Apr. 11, 1989 in the names of R. R. Ross and I. Vedejs. In it, a splice tray includes provisions on one side for holding optical fiber splices and metallic conductor splices on an opposite side. An electrical bonding and gripping assembly is adapted to be mounted on the splice tray. The closure also includes mating cover portions which are moved into engagement with each other to enclose the tray. Also, a waterblocking encapsulant may be introduced into the closure.

The prior art also includes an emergency restoration system which includes a self-contained portable system that is capable of being stored in a craftsperson's vehicle and carried in a handy carrying case to a cable damage location. One portion of a damaged optical fiber cable is inserted into one splice case and optical fibers of the cable are terminated in splicing devices therein. Another portion of the damaged cable on an opposite side of the damage location is terminated in another splice case. Portions of a temporary cable which is coiled adjacent an outer rim of the carrying case are uncoiled to span the damage location. Ends of the temporary cable are terminated by corresponding ones of the splicing devices in each splice case at each end of the temporary run. The temporary cable has an outer diameter of about 0.5 inch.

What is needed and what seemingly is not available in the prior art is a restoration kit for communications cable which kit is packaged in a carrying case with the weight of the kit and the case being less than about fifty pounds. The sought-after kit should be relatively inexpensive and should be capable of being deployed rapidly with easy payout of a restoration cable to restore service as quickly as possible after an outage.

SUMMARY OF THE INVENTION

The foregoing problems of the prior art have been solved by the restoration kit of this invention. A restoration kit for providing service around a damage location in a communications cable comprises a carrying case and a mounting platform which is disposed within the carrying case and which includes a recess therein. A deployment reel which includes two spaced flanges and a hub extending between the flanges is supported on the mounting platform. Also included is a first closure which includes connective means disposed therein to facilitate connecting of optical fibers of optical fiber cable and means for holding the first closure secured with respect to one of the flanges of the deployment reel. A second closure is supported on the mounting platform and includes optical fiber connective means to facilitate connections of optical fibers. A length of a restoration optical fiber cable which is wound in convolutions on the hub of the deployment reel has one end portion, the optical fibers of which are adapted to be connected to connective devices in the first closure, secured to the first closure and another end portion, the optical fibers of which are adapted to be connected to connective devices in the second closure, secured to the second closure. A payout spindle is supported on the mounting platform and is adapted to have an end portion disposed in the recess in the mounting platform to facilitate the mounting of the deployment reel on the spindle such that the restoration cable may be pulled from the reel generally in any direction which is radial of the payout spindle and which is normal to an axis of rotation of the reel. With the carrying case on one side of the damage location, the restoration cable is unwound from the reel by moving the second closure to a location along the damaged cable which is remote from the damage location whereat connections are made within the second closure between the optical fibers of the restoration cable and optical fibers of the damaged cable. Connections also are made between the optical fibers of the restoration cable and optical fibers of the damaged cable within the first closure.

BRIEF DESCRIPTION OF THE DRAWING

Other features of the present invention will be more readily understood from the following detailed description of specific embodiments thereof when read in conjunction with the accompanying drawings, in which.

DETAILED DESCRIPTION

Figure 1:
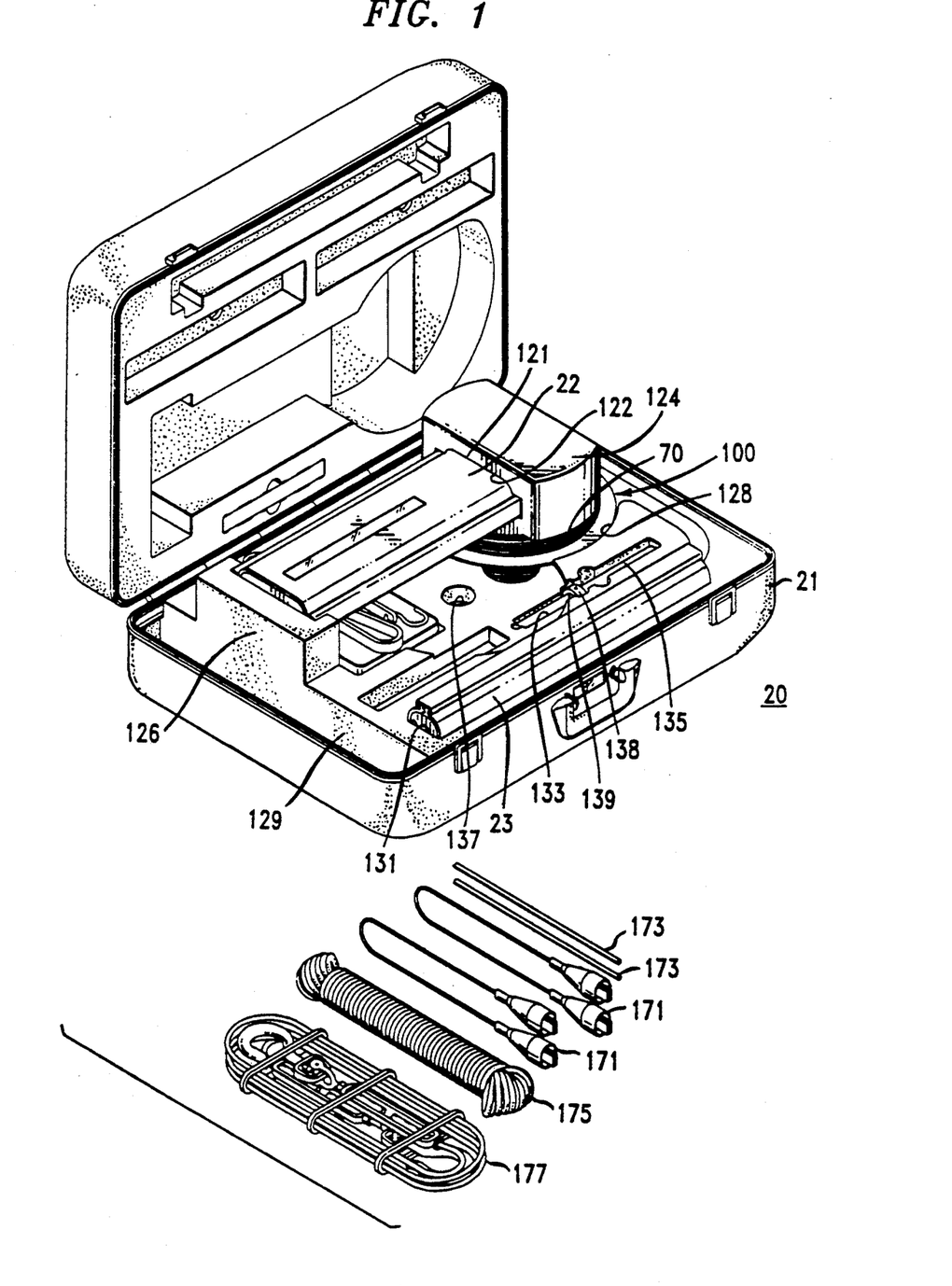
FIG. 1 is a perspective view of a restoration kit of this invention.

Referring now to FIG. 1 there is shown a restoration kit which is designated generally by the numeral 20 and which is used to provide service around damage locations in communications cables. The restoration kit 20 includes a carrying case 21 in which are disposed a first closure 22 and a second closure 23 which is identical to the closure 22. Each closure has a longitudinal axis 26 (see FIG. 2).

Figure 2:
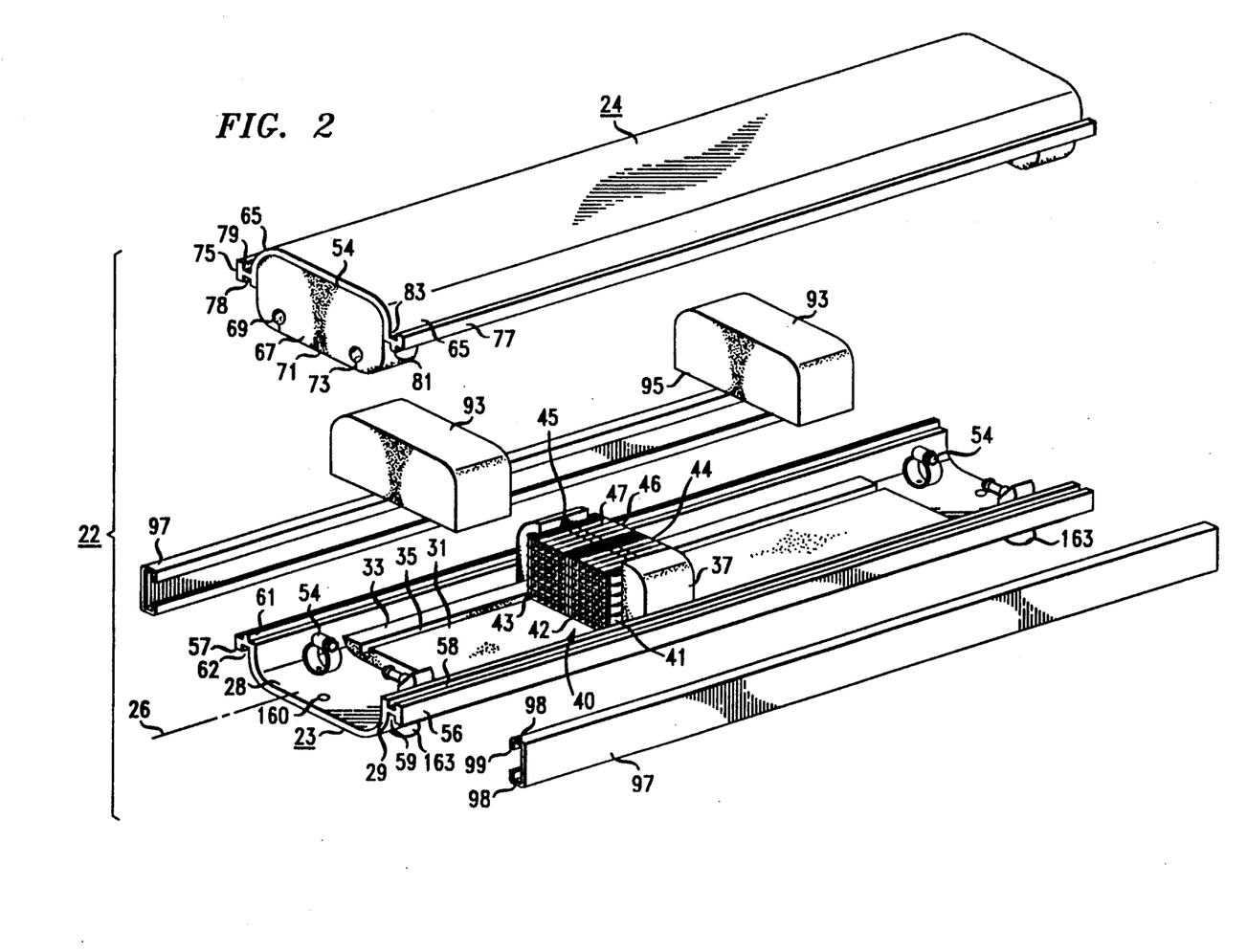
FIG. 2 is a perspective view of a closure, two of which are included in the restoration kit.

Going now to FIG. 2, it can be seen that closure 22 includes a base 24 and a cover 25. The closure 22 may be one such as is described and claimed in commonly assigned application Ser. No. 07/826,711 filed on Jan. 28, 1992 herewith in the names of W. H. Bensel and G. S. Cobb. The base 24 has an invert portion 28 and sidewalls 29—29. Furthermore the base 24 includes a pad 31 including radiused, longitudinally extending side portions 33—33 and two spaced apart longitudinally extending grooves 35—35. Preferably, the pad 31 is made of a foamed polymeric material. The pad 31 is inserted therein to support two side supports or pedestals 37—37 between which are adapted to be disposed a plurality of splicing device holders or modules 40—40. Each of the modules 40—40 is adapted to hold any one of several different kinds of commercially available connective devices. Such a module is described and claimed in commonly assigned copending application Ser. No. 07/776,720 which was filed on Oct. 15, 1991 in the name of W. W. Jones and which is incorporated by reference hereinto. A suitable connective device is one described and claimed in application Ser. No. 07/682,888 filed on Apr. 8, 1991 in the names of J. A. Aberson, et al.

Viewing again FIG. 2, it can be seen that each splicing module 40 includes a plurality of holders 41—41 each of which includes a base 42 and two sidewalls 43—43. Disposed in each holder 41 is an insert 44 which is adapted to store a plurality of optical fiber splices which may be made using any of a plurality of commerically available optical fiber splice arrangements. Each insert is made of a material such as a foamed polymeric material which is compliant about the configuration of the particular connective arrangement which is used.

As can be seen in FIG. 2, the insert 44 includes two sidewalls 45—45 between which are disposed a plurality of partitions 46—46. A nest 47 is formed between each sidewall 45 and the adjacent partition and is formed between adjacent ones of the partitions. Each nest is adapted to hold a connective device for optical fibers.

Also attached to each end of the base 24 are a plurality of ring clamps 54—54. Each cable end portion extends through a ring clamp 54 into an inner portion of the base 24.

Further as can be seen in FIG. 2, the base 24 is provided with longitudinally extending side portions 56 and 57. The side portion 56 is H-shaped in cross section with one groove 58 thereof facing toward the cover 25 and one groove 59 thereof facing toward a plane which extends through the invert portion 28. The side portion 57 includes a rib 61 which faces toward the cover 25 and a groove 62 which faces toward the plane of the invert portion 28.

Figure 3:
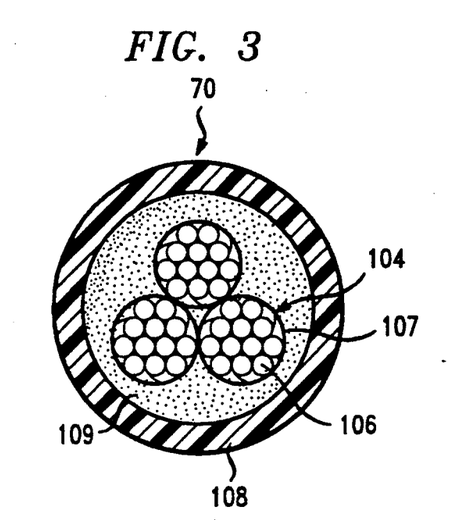
FIG. 3 is an end view of a cable which is included in the restoration kit of FIG. 1.

Viewing again FIG. 2, it is seen that the cover 25 also is U-shaped, having a center portion 54 and longitudinally extending edge portions 65—65. Attached to the cover 25 at each of its ends and disposed between the side portions 65—65 and in engagement with an inner surface of the center portion is an end dam or block 67. Preferably, the end block 67 is made of a foamed polymeric material such as a foamed polyurethane ester material and has a plurality of bores 69—69 extending therethrough. When the cover 25 is assembled to the base, a lower portion 71 of each end block is adapted to be received in engagement with the invert portion 28 and the side leg portions 29—29 of the base. Cables which extend into the closure are received within the bores 69—69 which communicate with an exterior of the end dam through slits 73—73. Through one of the bores in each closure is adapted to extend an end portion of a restoration cable 70 (see also FIGS. 1 and 3) and through the other bore of one of the end blocks is adapted to extend an end portion of a damaged cable, the end portion being on the portion of the cable going away from the damage location. The restoration cable 70 may be one such as that described in copending commonly assigned application Ser. No. 07/826,740 filed on Jan. 28, 1992 herewith in the names of J. R. Holman, P. A. Moss and T. D. Mathis and having an outer diameter of about 0.185 inch.

The cover 25 includes provisions which are mateable with the longitudinally extending portions 56 and 57 of the base to allow the cover to be assembled to the base. As is seen in FIG. 2, one of the side portions 65—65 of the cover is provided with a longitudinally extending interlocking portion 75 whereas the other side portion 65 is provided with an interlocking portion 77. The interlocking portion 75 is H-shaped in transverse cross section and includes two grooves, one designated 78 which faces the base 24 and adapted to receive the rib 61 of the base and the other designated 79. The other interlocking portion 77 includes a rib 81 which faces the base 24 and which is adapted to be received in the groove 58 of the base and an opposite groove 83.

Two blocks 93—93 each of which preferably is made of a foamed polymeric material are positioned so that each is adjacent to an end of the closure 22. Portions of fibers to be spliced are caused to become disposed in the grooves 35—35 of the pad 31 within the grooves 35—35 between a lower portion 95 of a block 93 and the pad 31.

Longitudinal edge clamping strips 97—97 which are C-shaped are adapted to clamp together the base 24 and the cover 25. Each clamping strip is provided with two hook-like portions 98—98 having inwardly directed free edge portions 99—99. On one side of the closure, a free edge portion 99 is adapted to be received in the groove 79 of the cover and the other free edge portion received in the groove 62 of the longitudinal edge portion 57. As for the other clamping strip 97, one free edge portion is adapted to be received in the groove 83 of the cover and the other free edge portion in the groove 59. Each clamping strip 97 is resilient and the free edge portions must be forcibly spread apart to enable them to be received in the grooves as described hereinbefore. As a result, the clamping strips 97—97 are effective to apply forces to the longitudinal edge portions of the base and the cover when they are assembled to secure together the base and the cover.

As can be seen in FIG. 1, the restoration kit 20 includes a deployment reel 100 on which are wound convolutions of a length of the restoration cable 70. The cable 70 may include one or more bundles 104—104 (see FIG. 3) each including a plurality of optical fibers 106—106. The fibers of each bundle 106 are held together by two binders 107—107 which are wrapped in opposite helical directions about the fibers of the bundle. Disposed about the bundle or bundles of optical fibers is a plastic jacket 108 which has a thickness of about 0.030 inch. Interposed between the bundles 104—104 and the jacket is a yarn-like material 109 such as Kevlar® yarn, for example, which provides the cable with desired strength characteristics and which cushions the fibers against impact. The yarn-like material 109 is wrapped about the bundles with a unidirectional lay or with an oscillated lay.

Figure 4:
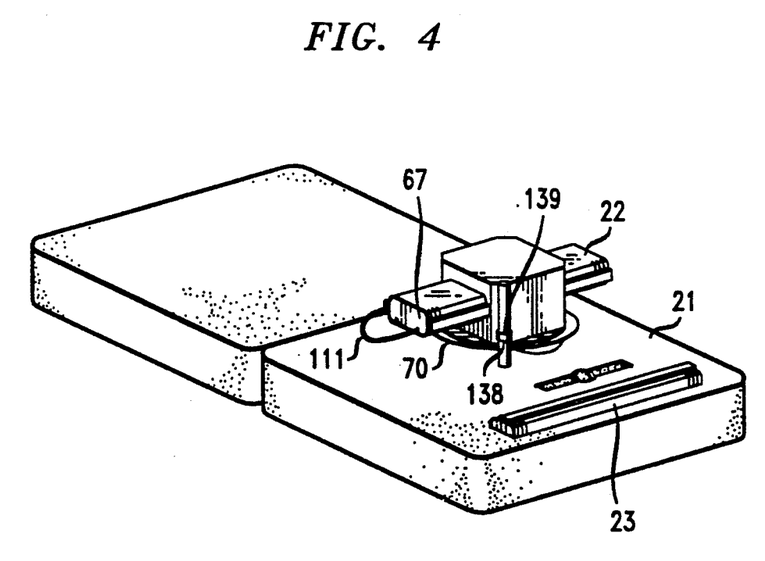
FIG. 4 is a simplified perspective view of the restoration kit showing the position of a payout spindle and the payout position of a first closure in a deployment reel closure holder.

As can be seen in FIG. 4, one end portion 111 of the cable 70 extends through a bore in an end block 67 of the closure 22 and is secured therein whereas the other end portion 112 of the cable extends through a bore in an end block of the closure 23 and is secured therein. As the case 21 is received in the field, both end portions 111 and 112 enter their associated closures from the right as viewed in FIG. 1. The fibers of the end portions of the restoration cable 70 which are prepared in the factory for termination are terminated in the field by splicing devices (not shown) in the closures 22 and 23.

Also as can be seen in FIG. 1, the first closure 22 is supported within the case 21 with one end portion 121 extending into an opening 122 of a mounting block 124. Preferably, the mounting block 124 is made of a foamed plastic material. A portion of the cover and or base of the first closure 22 is caused to have frictional engagement with the mounting block 124 through a frictional member 125 (see FIG. 5) to prevent movement of the first closure relative to the deployment reel as the deployment reel is turned rotatably to pay off increments of length of the restoration cable 70. An opposite end of the closure 22 is supported by a post 126 of a mounting pad 129 which may be a foamed polymeric material. The mounting block 124 is attached to an upper end of the deployment reel 100 which is disposed in a cavity 128 of the pad 129 which is contoured to fit into the case 21.

The second closure 23 is disposed within a pocket 131 provided within the pad 129 such that one of the longitudinal edge portions of the base and its mated longitudinal edge portion of the cover face out of the pad 129.

Also disposed within a pocket 133 (see FIG. 1) in the pad 129 is a payout spindle 135. The payout spindle 135 is adapted to be removed from the pocket 133 and have an end portion inserted into an aperture 137 formed in the pad 129. As is seen, the deployment spindle 135 is provided with an O-ring 139 (see FIGS. 1 and 5) and a collar 138. The O-ring and the collar act as a braking system to reduce freewheeling of the deployment reel.

Figure 6:
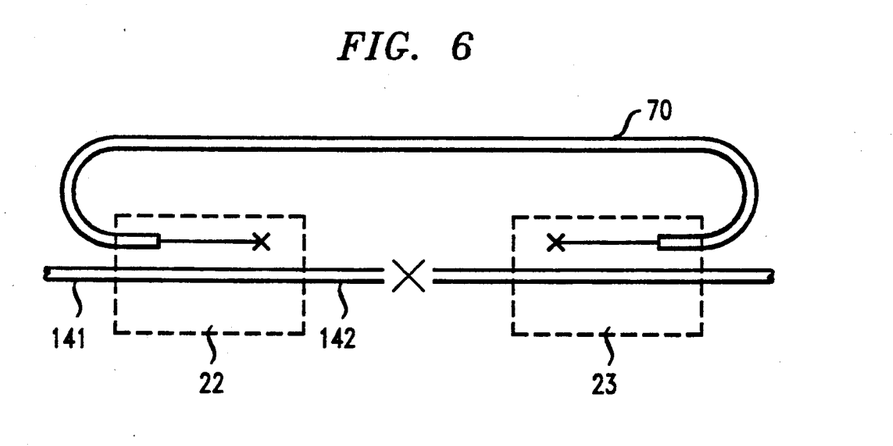
FIG. 6 is a schematic view which shows the use of the restoration kit to provide service for a total cable failure with no slack.
Figure 7:
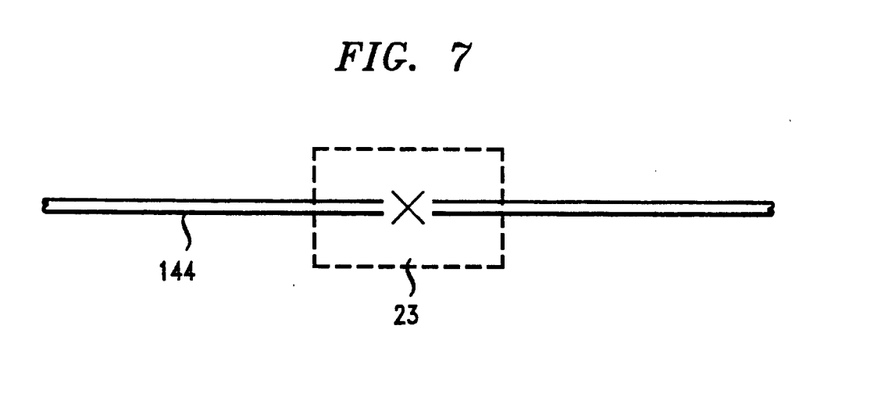
FIG. 7 is a schematic view which shows the use of the restoration kit to provide service for a total cable failure with slack.
Figure 8:
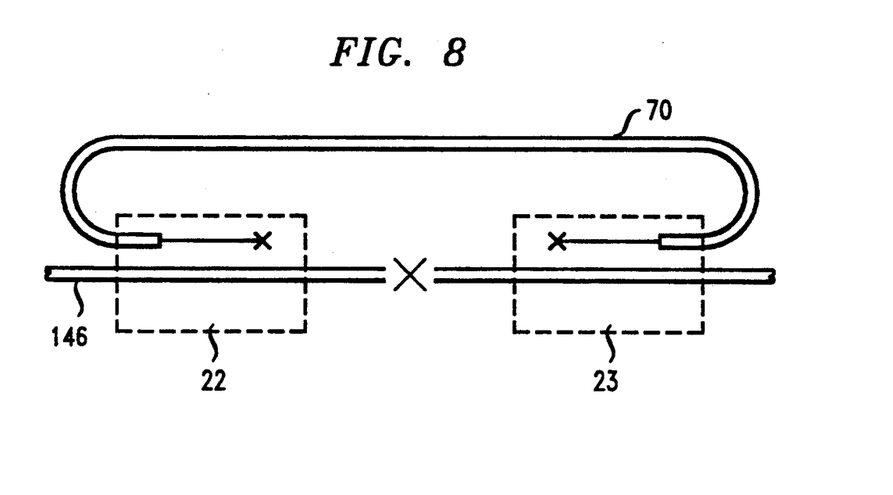
FIG. 8 is a schematic view which shows the use of the restoration kit to provide service for a partial cable failure with a taut sheath.

Going now to FIGS. 6, 7 and 8, there are shown schematic views of three different situations in which interruptions to service occur. First, in FIG. 6, a total cable failure has occurred and there is no slack in the run of a cable 141 which has been damaged. The total damage failure may have been caused by engagement of excavating equipment with the cable. As can be seen in FIG. 6, service is restored by causing an end portion 142 of the cable 141 to be spliced to portions of the restoration cable 70 in the first closure 22. The restoration cable 70 is deployed across the damage location and the second closure 23 is used to cause fibers at an opposite end of the restoration cable to be spliced to fibers of the cable 141 on the other side of the damage location.

In FIG. 7, the kit 20 is used to restore service by facilitating connections between end portions of a cable 144 which has been severed but which has slack. The slack is sufficient so that an end portion of the restoration cable may be removed from the second closure 23 of the kit, for example, and the second closure used to receive the end portions of the cable 144 caused by the damage. Splices then are made within the second closure between corresponding optical fibers on opposite sides of the damage location.

Lastly, FIG. 8 depicts the situation in which a cable 146 has experienced partial failure. The cable 146 has no slack, i.e., the sheath is taut. Should the cable 146 be damaged only partially, the sheath is removed for a distance equal to the distance between ring clamps 54—54 at opposite ends of a closure at locations on opposite sides of the damage location. Then ring clamps at opposite ends of the base are opened to allow the damaged portion of the cable to extend therethrough. The ring clamps are tightened and the damaged fibers spliced to fiber end portions at one end of the restoration cable 70. Sheath entry is made into the cable 146 at a predetermined distance from the damage point with the exposed portion of the cable positioned in a second closure. The fibers now disposed in the second closure and which extend from the damaged portions are spliced to the other end of the restoration cable 70.

In the preferred embodiment, the side supports 37—37 are disposed off-center of the closure (see FIG. 2). This is done in order not to fall below the minimum bend radius of the fiber when the closure is used to restore service in a partial outage situation. In a partial outage, and as mentioned hereinbefore, a cable which includes some damaged fibers is extended through the closure. Those optical fibers which have been damaged are cut dead ahead at a location 148 (see FIG. 2), looped on one side of the modules 40—40 and then spliced to optical fibers of the restoration cable 70 which enter the closure on the left and which enter the splicing modules from the right-hand side as viewed in FIG. 2. Optical fibers which have not been damaged extend along a groove 35 between sheathed ends of the damaged cable within the closure.

Beginning with FIG. 4, a sequence of views will be referred to in describing the use of the restoration kit. The kit 20 is caused to be disposed adjacent to a damaged cable on one side of a damage location. In FIG. 4, the kit 20 is depicted after a craftsperson has moved slidably the first closure within the mounting block until it is substantially centered therein. Also, in FIG. 4 the craftsperson has caused the payout spindle to be mounted in an erect position extending from the aperture 137 in the pad 129 such that the O-ring 139 is facing away from the pad 129 (see also FIG. 5).

Figure 9:
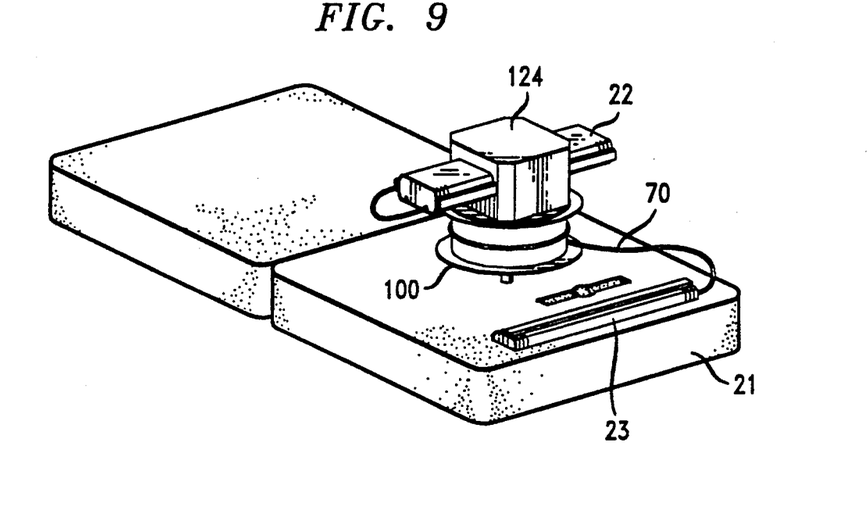
FIG. 9 is a simplified perspective view of the deployment reel mounted on the payout spindle.

Then the deployment reel 100 is removed from the cavitiy 128 in the pad 129 and the opening in the bottom of the hub of the reel is aligned with the payout spindle. The reel is moved slidably with respect to the payout spindle to cause the payout spindle to be received in the reel hub until the reel is seated firmly on the O-ring 139 of the spindle collar (see FIGS. 5 and 9). It should be observed that the first closure 22 is centered with respect to the mounting block 124 so that it is balanced during rotation of the deployment reel 100 to pay off the restoration cable 70.

Figure 10:
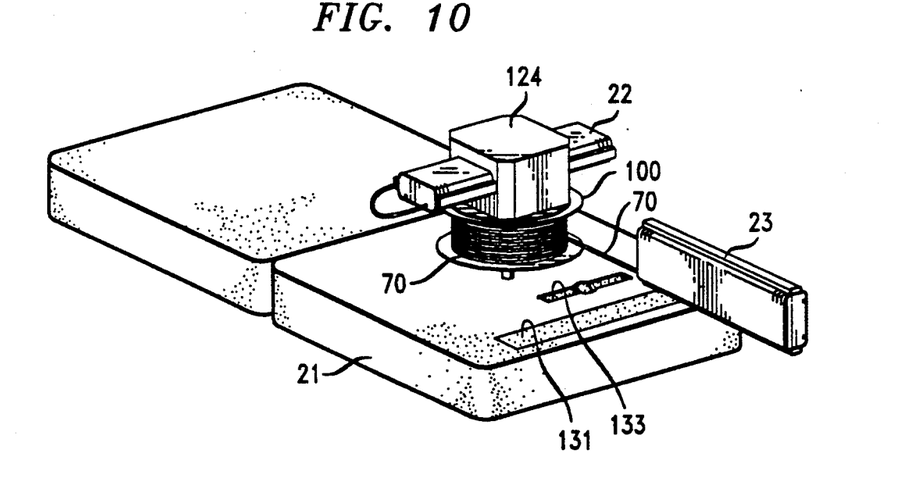
FIG. 10 is a simplified perspective view of a second closure positioned to be moved away from the carrying case to a portion of the cable on the other side of a damage location.

Referring now to FIG. 10, there is illustrated the next step in the use of the restoration kit 20. The second closure 23 has been removed from its recess in the pad 129 and is to be moved away from the case 21. Because the deployment reel 100 now is mounted rotatably on the payout spindle, the reel turns under the application of pulling forces to the second closure. As this is done, successive portions of the length of the cable 70 are unwound from the reel.

Freewheeling and backlash of the cable 70 is avoided as the cable is unwound from the reel. This is accomplished by the frictional cooperation of the reel with the O-ring 139 (see FIG. 5). Frictional forces also are applied at an upper end 151 of the spindle 135, as viewed in FIG. 5, the upper end of the spindle engaging an innermost surface of a recess 153 which is formed in the mounting block 124 and in which is received an end portion of the spindle 135. Further frictional forces are generated between a flange of the reel 100 and a surface 155 (see FIG. 5) of a well 157 in which the flange is received when the reel 100 is mounted on the payout spindle 135. The location of the collar 138 on the payout spindle 135 is adjustable to adjust the frictional forces between the flange of the reel 100 and the surface 155 of the well 157 in the pad 129. Advantageously, because of the position of the reel flange with respect to the surface 155 of the pad 129, convolutions of the restoration cable 70 do not become snagged between the flange and an inner surface of the well 157.

Advantageously, the restoration kit 20 weighs about 45 lbs. This weight is substantially low to enable craftspersons in the field to be able to carry the case 21 and its contents over a substantial distance.

Figure 11:
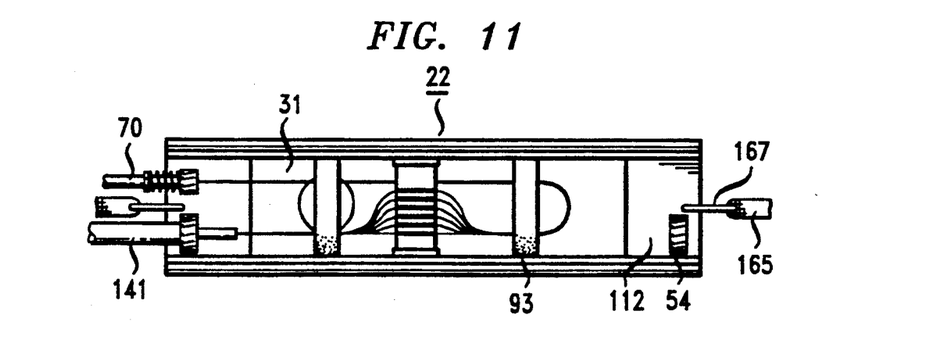
FIG. 11 is a schematic view of one of the closures of the restoration kit with a plurality of fibers of the restoration cable being spliced to fibers of the damaged cable.

The second closure is carried to a location on the other side of the damage location. Assuming a total break, such as is illustrated in FIG. 6, an end portion of the damaged cable is moved through a slit 73 and inserted into an opening 69 in an end block 67 of the second closure, sheath elements are removed and optical fibers thereof are spliced to optical fibers of the restoration cable 70. Then, the first closure 22 is removed from the block 124 and optical fibers of an end portion of the restoration cable which had been extended into the first closure in the factory are spliced to optical fibers of the damaged cable on the one side of the damage location. Viewing now FIG. 11, there is shown a schematic of the first closure 22 after optical fiber of the damaged cable and of the restoration cable 70 have been connected together within the base.

An additional feature of the closure is a system which is adapted to hold the closure stabilized in the field while splicing operations are performed. To this end, the base 24 of the closure includes an opening 160 (see FIG. 2) formed adjacent to each end thereof. Also, the base 24 is provided with feet 163—163, two projecting outwardly from the invert portion 28 at each end. Preferably the feet 163—163 are made of a rubber material. During splicing, either closure may be secured to the carrying case 21 with an elastic cord 165 (see FIG. 11) having a hook 167 at each end. One hook 167 is looped through the opening 160 at one end of the base, the cord routed along one side of the carrying case of the restoration kit opposite to that engaged by the feet and the hook at the other cord end looped through the opening 160 at the other end of the base. The cord 165 holds the base 24 to the case 21 to facilitate splicing. Afterwards, the cord is removed. The feet prevent slippage between the base and the carrying case.

As can be seen in the FIG. 1, the kit 20 also may include several additional elements. Two grounding cables 171—171 and two grounding rods 173—173 for grounding a damaged cable may be included. Also, the kit may include a package 175 of rope for lashing cables to support strands in aerial runs and a turnbuckle assembly 177 which is used to apply pulling forces to the damaged cable.

An advantage of the restoration kit of this invention is that it may be reused. After permanent repairs have been made, the first and second closure are disconnected from the previously used cable and the restoration cable is rewound on the payout spindle 135. Rewinding is accomplished with the help of the first closure. The first closure 22 is used as a crank and is turned manually to turn the deployment reel and rewind the cable thereon.

Figure 5:
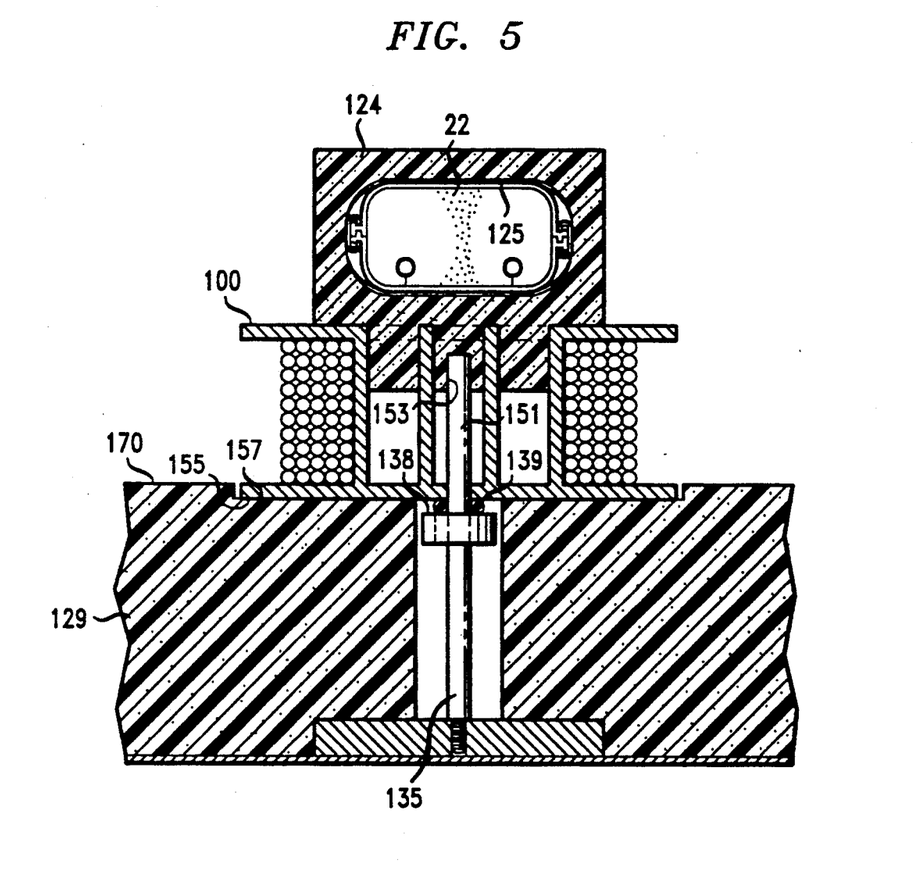
FIG. 5 is a detail side elevational view in section of the deployment reel as it is disposed within a well of a pad in one portion of a carrying case.

A further advantage of the restoration kit derives from the arrangement of the reel 100 in its payout position with respect to the case 21. As can be seen in FIGS. 4 and 5, for example, the payout spindle 135 in operative position is perpendicular to major surfaces of the pad, such as a surface 170, for example, which are parallel to a plane between the two portions of the carrying case 21. As a result, increments of length of the restoration cable may be unwound from the deployment reel generally in any direction radially of and normal to a longitudinal axis of the payout spindle.

It is to be understood that the above-described arrangements are simply illustrative of the invention. Other arrangements may be devised by those skilled in the art which will embody the principles of the invention and fall within the spirit and scope thereof.

We claim:

1. A restoration kit for providing service around a damage location of a communications cable, said restoration kit comprising:
    a carrying case which includes first and second portions adapted to be secured together;
    a mounting platform which is disposed within said first portion of said carrying case and which includes a recess therein;
    a deployment reel which includes two spaced flanges and a hub extending between said flanges and which is supported on said mounting platform;
    a first closure which includes connective means disposed therein to facilitate connecting of optical fibers of optical fiber cables thereto;
    means for holding said first closure secured with respect to one of the flanges of said deployment reel;
    a second closure which is supported on said mounting platform and which includes optical fiber connective means to facilitate connections between optical fibers;
    a length of restoration optical fiber cable which is wound in convolutions on said hub of said deployment reel, said restoration optical fiber cable having one end portion, the optical fibers of which are adapted to be connected through connective means in said first closure to optical fibers of the damaged cable on one side of a damage location, secured in said first closure and another end portion, the optical fibers of which are adapted to be connected through connective means in said second closure to optical fibers of the damaged cable on an opposite side of the damage location, secured in said second closure; and
    a payout spindle which is supported to said mounting platform and which is adapted to have an end portion disposed in said recess in said mounting platform to cause said spindle to be disposed to facilitate the mounting of said deployment reel on said spindle such that said second closure together with the other end portion of said length of restoration optical fiber cable may be moved generally in any radial direction from said spindle in a direction normal to an axis of rotation of said reel to a location along the damaged cable which is remote from the damage location and at which connective arrangements are made within said second closure between optical fibers of said restoration cable and optical fibers of the damaged cable.

2. The restoration kit of claim 1, wherein said payout spindle includes a collar intermediate its ends and an O-ring which is made of a material having a relatively high coefficient of friction so that when said deployment reel is mounted on said spindle, one of said flanges engages said O-ring.

3. The restoration kit of claim 2, wherein when said deployment reel is mounted on said payout spindle and engages said O-ring, one of said flanges of said reel is disposed adjacent to and parallel to a major surface of said mounting platform.

4. The restoration kit of claim 3, wherein said mounting platform includes a well to which said recess opens such that when said payout spindle is mounted in said recess and said reel mounted on said payout spindle, a portion of said reel is disposed within said well such that an inner surface of said one flange is substantially coplanar with said major surface of said mounting platform.

5. The restoration kit of claim 4, wherein said collar is adjustable to adjust the frictional engagement of said one flange of said deployment reel with an inner surface of said well of said mounting platform.

6. The restoration kit of claim 5, wherein said means for holding said first closure secured with respect to said one flange of said reel includes a mounting block having an opening therethrough, said first closure extending into said opening in said mounting block.

7. The restoration kit of claim 6, wherein said mounting block includes an aperture therein which aperture is adapted to receive an end portion of said payout spindle when said deployment reel is mounted on said payout spindle.

8. The restoration kit of claim 7, wherein said mounting blocks is made of a foamed polymeric material.

9. The restoration kit claim 8, which also includes means for causing frictional engagement of said first closure with said mounting block.

10. The restoration kit of claim 8, wherein said each closure includes a base and a cover which are mateable along longitudinally extending edge portions.

11. The restoration kit of claim 10, wherein each said closure includes a plurality of connective modules, each said module including a plurality of nests each of which is capable of holding a connective device for optical fibers.

12. The restoration kit of claim 11, wherein said restoration cable includes a plurality of bundles of optical fibers, each said bundle of fibers having a binder wrapped thereabout, a yarn-like strength member system and a plastic jacket.

13. The restoration kit of claim 11, wherein one end of said restoration cable is secured in said first closure and the other end is secured in said second closure with optical fibers of the restoration cable in each closure being prepared for connective arrangements with optical fibers of the damaged cable.

14. The restoration kit of claim 13, wherein each of said closures includes two end blocks one at each end of each closure, each of said end blocks including passageways through which a portion of said restoration cable or of a damaged cable may extend, each of said end blocks being made of a compliant material.

15. The restoration kit of claim 14, wherein each of said end blocks is made of a foamed polymeric material.

16. The restoration kit of claim 14, wherein said modules are held between two pedestals such that longitudinal axes of the connective arrangements between said restoration cable and a damaged cable are parallel to a longitudinal axis of the closure and wherein said pedestals are closer to one end of said closure than to an opposite end.

17. The restoration kit of claim 1, wherein said second portion of said case includes a pad of compliant material having recesses therein to receive portions of said first and second closures and said mounting block and said deployment reel.

* * * * *